(12) United States Patent
Kelso et al.

(10) Patent No.: US 10,616,325 B2
(45) Date of Patent: Apr. 7, 2020

(54) ALLOCATION OF BROADER NETWORK BANDWIDTH WITHIN A LOCAL NETWORK

(71) Applicant: Lenovo (Singapore) Pte. Ltd., Singapore (SG)

(72) Inventors: Scott Edwards Kelso, Cary, NC (US); Rod D. Waltermann, Rougemont, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 211 days.

(21) Appl. No.: 15/085,659

(22) Filed: Mar. 30, 2016

(65) Prior Publication Data

US 2017/0289056 A1    Oct. 5, 2017

(51) Int. Cl.
*H04L 29/08*    (2006.01)

(52) U.S. Cl.
CPC .................. *H04L 67/1091* (2013.01)

(58) Field of Classification Search
None
See application file for complete search history.

(56) References Cited

U.S. PATENT DOCUMENTS

| | | | | |
|---|---|---|---|---|
| 2011/0149875 A1* | 6/2011 | Ahuja | ................. | H04L 47/72 370/329 |
| 2013/0225266 A1* | 8/2013 | Mir | ................. | G07F 17/32 463/25 |
| 2014/0365569 A1* | 12/2014 | Vyrros | ................. | H04W 4/12 709/204 |
| 2015/0113588 A1* | 4/2015 | Wing | ................. | H04L 63/0227 726/1 |

\* cited by examiner

*Primary Examiner* — Adnan Baig
(74) *Attorney, Agent, or Firm* — Ference & Associates LLC (57) ABSTRACT

One embodiment provides a method, including: allocating, at a node within a local network, availability to a broader network into one or more units; associating, using a processor, one or more tokens with the one or more units; distributing, over a network, the one or more tokens to a requesting node; receiving, over a network, the one or more tokens from the requesting node, where the one or more tokens have been associated with network payload; confirming, using the processor, that the one or more tokens are valid; and in response to the confirming, sending the network payload onto the broader network. Other embodiments are described and claimed.

26 Claims, 4 Drawing Sheets

ALLOCATION OF BROADER NETWORK BANDWIDTH WITHIN A LOCAL NETWORK

BACKGROUND

Information handling devices ("devices" or "electronic devices"), for example laptop computers, smart phones, tablet devices, and the like are utilized for communicating data over a network, for example accessing the Internet via a WI-FI access point or a telecommunication cell tower to download media content, send electronic communications, etc. In situations where many client nodes desire to communicate with the Internet (or another large network) through a single node or a limited set of nodes, termed herein "gateway(s)" to the broader network, noisy or especially busy nodes, i.e., those nodes requesting or sending network traffic through the gateway node, can consume far more than their fair share of the available bandwidth. Common examples of this include apartment complexes, hotels, and publicly available access points to which many user devices connect. Similar scenarios, however, may be encountered in a simple home network, e.g., where end user devices compete for bandwidth available from an Internet router when downloading large amounts of data, such as when multiple devices are attempting to stream video content using a single router device.

A common scenario is therefore to have a shallow network, i.e., with many internal nodes (e.g., laptops, tablets, smart phones, etc.) connected directly to the broader network using a gateway device (e.g., many end user devices connected directly to a single router). Where this type of scenario is encountered, data management techniques such as dropping of packets, queuing of packets, and/or controlled queuing of packets is/are often employed, e.g., based on a particular link's permissible data rate.

BRIEF SUMMARY

In summary, one aspect provides a method, comprising: allocating, at a node within a local network, availability to a broader network into one or more units; associating, using a processor, one or more tokens with the one or more units; distributing, over a network, the one or more tokens to a requesting node; receiving, over a network, the one or more tokens from the requesting node, wherein the one or more tokens have been associated with network payload; confirming, using the processor, that the one or more tokens are valid; and in response to the confirming, sending the network payload onto the broader network.

Another aspect provides a method, comprising: sending, from a requesting node to another node within a local network, a request for one or more tokens associated with units of availability to a broader network; receiving, at the requesting node, the one or more tokens; associating, by the requesting node, the one or more tokens with network payload, wherein the one or more tokens confirm that the network payload is valid; and sending, over the local network, the one or more tokens and the network payload to a gateway node.

A further aspect provides a device, comprising: a network communication device; a processor operatively coupled to the network communication device; and a memory storing instructions executable by the processor to: allocate, at a node within a local network, availability to a broader network into one or more units; associate one or more tokens with the one or more units; distribute, over a network, the one or more tokens to a requesting node; receive, over a network, the one or more tokens from the requesting node, wherein the one or more tokens have been associated with network payload; confirm that the one or more tokens are valid; and in response to confirming that the one or more tokens are valid, send the network payload onto the broader network.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, gateway nodes may be overwhelmed by the number or type of data requests that are encountered. This leads to slowed network connectivity, which often spreads throughout the entire network. For example, one or two end user nodes that have large bandwidth requirements may slow traffic through the gateway node for all nodes connected to the broader network there-through. Conventional techniques such as data queuing have been frustrating at best, as often all nodes connecting through the gateway node suffer reduced performance, at least to some degree (e.g., according to the allocated bit rate assigned to a node's data link).

Accordingly, an embodiment provides a technique to allocate network bandwidth for nodes in a more intelligent fashion. In an embodiment, the allocation of network bandwidth to nodes is implemented by a gateway service that specifically permits certain packets of certain nodes to be communicated through the gateway, whereas unauthorized packets are not permitted to be communicated through the gateway. Therefore, an embodiment employs a packet-specific approach to use of gateway bandwidth by connecting nodes.

In an embodiment, the packet-specific network allocation is implemented using cryptographic techniques that permit pre-authorized packet communication to pass through the gateway node.

In an embodiment, the packet-specific network allocation is applied in a peer-to-peer network, which is a network that may be utilized an alternative approach to traditional (e.g., shallow) networks. The nodes in the peer-to-peer network may be static, such as wireless routers in a neighborhood or apartment building; or, the nodes may be dynamic, such as smart phones at a sporting event. Such peer-to-peer networks are available even in an emergency situation where normal network infrastructure has failed. Peer-to-peer set up protocols exist to self-organize and maintain such peer-to-peer networks.

An embodiment places a gateway node in control of token distribution, where tokens are utilized by other nodes to gain access to the broader network. Typically, one or more nodes will provide connectivity out to the broader network, i.e., they act as gateway nodes. Because peer-to-peer networks are ad-hoc and gateway nodes with Internet access cannot directly see all the nodes sending it traffic, a few nodes within the peer-to-peer network again can easily consume more than their fair share of the bandwidth through the gateway(s). In the peer-to-peer network, an embodiment provides a mechanism to create participant nodes that opt-in to forward packets to/from other nodes that are visible (i.e., that are peers) based on a packet-specific bandwidth allocation technique.

The illustrated example embodiments will be best understood by reference to the figures. The following description is intended only by way of example, and simply illustrates certain example embodiments.

Figure 1:
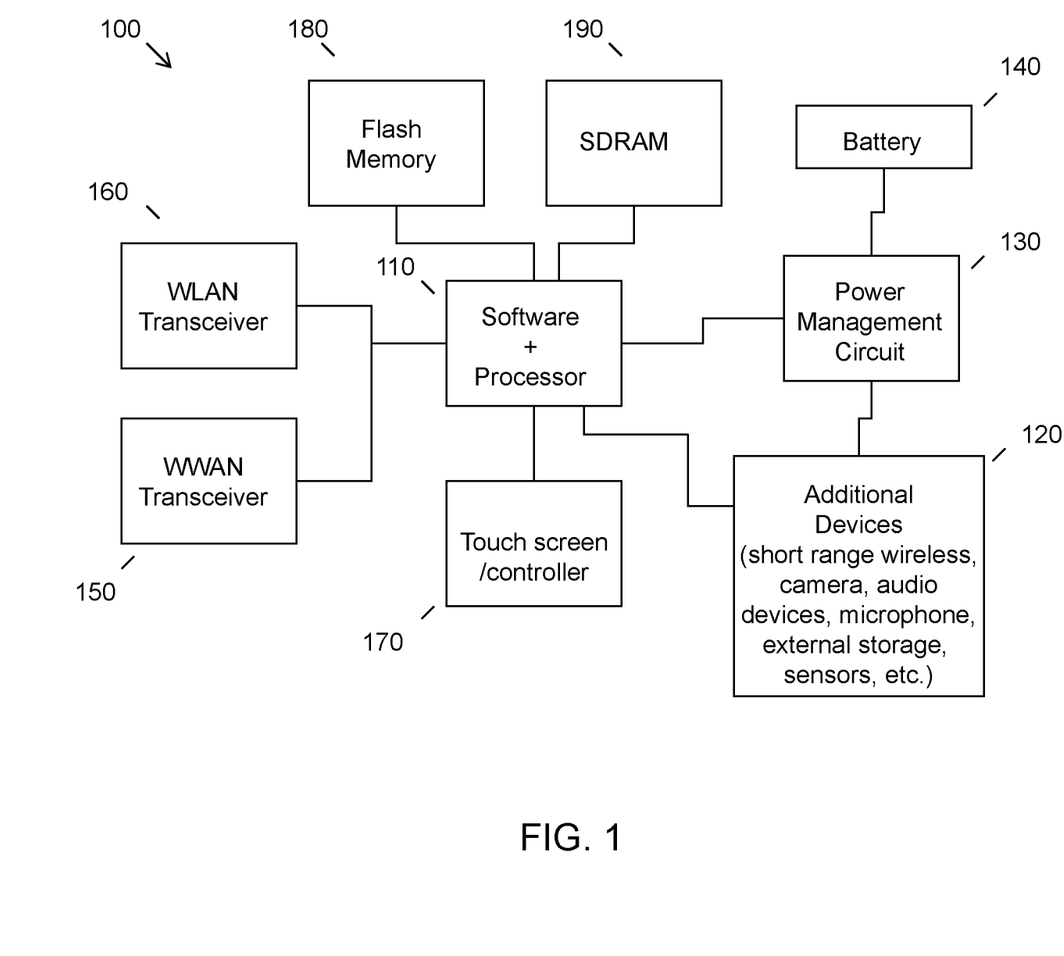
FIG. 1 illustrates an example of information handling device circuitry.

While various other circuits, circuitry or components may be utilized in information handling devices, with regard to smart phone and/or tablet circuitry 100, an example illustrated in FIG. 1 includes a design found for example in tablet, smart phone or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the processor, memory control, and I/O controller hub all into a single circuit 110. Also, systems 100 of this type do not typically use SATA or PCI or LPC. Common interfaces, for example, include SDIO and I²C.

There are power management circuits 130, e.g., a battery management unit, BMU. The power management circuits 130 manage power as supplied, for example, via a rechargeable battery 140. In at least one design, a single circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a short range wireless device for communicating with other devices. System 100 often includes a touch screen 170 for data input and display/rendering. System 100 also typically includes various memory devices, for example flash memory 180 and SDRAM 190.

Figure 2:
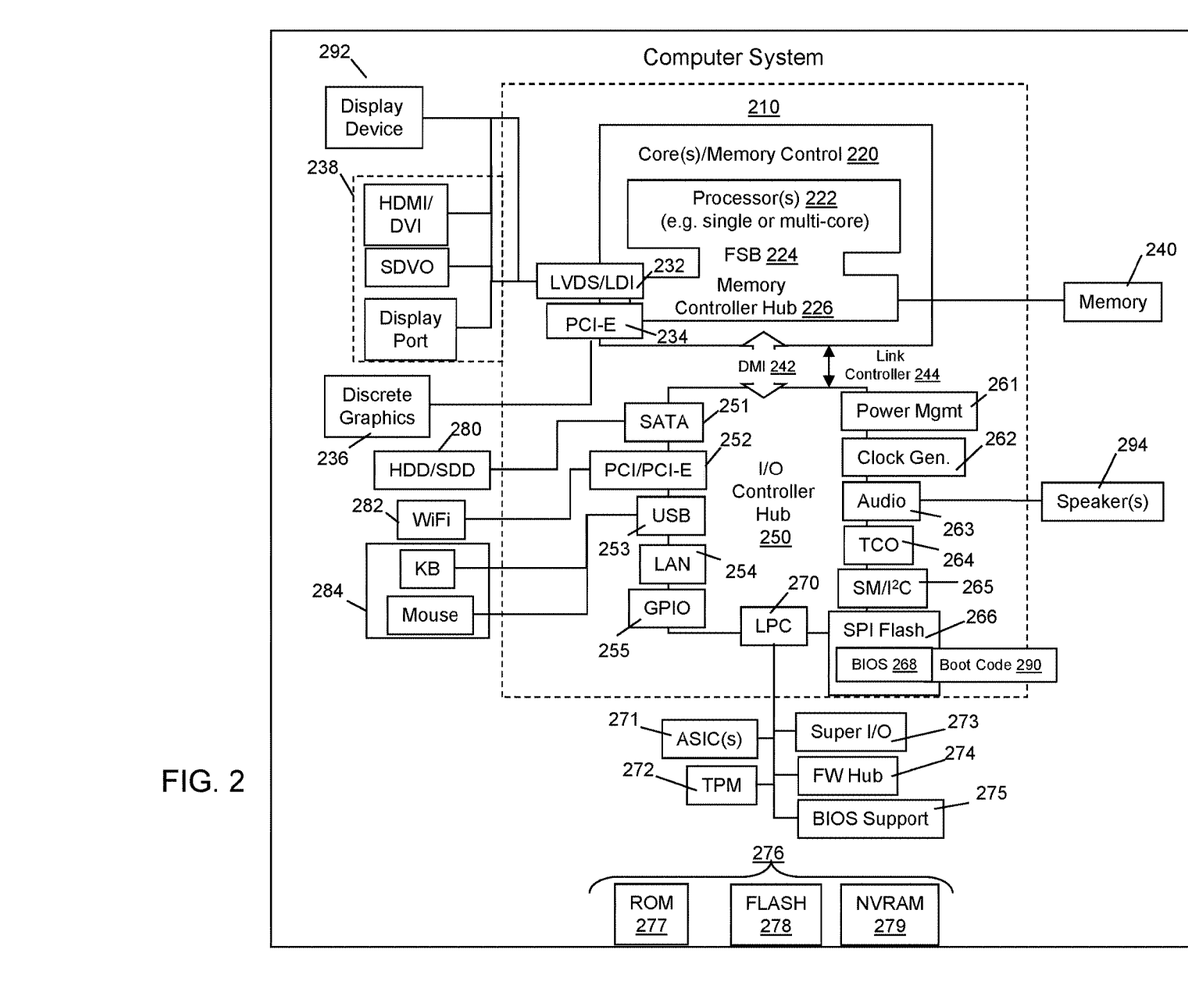
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a group of integrated circuits that work together 210 with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the integrated circuits 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a circuit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that connect to a network such as the Internet. The devices that use circuitry such as that outlined in FIG. 1 and/or FIG. 2 may include, but are not necessarily limited to, nodes within a network that act as end points or client nodes, peers in a peer-to-peer network, and/or gateway nodes that connect other devices to a broader network.

Figure 3:
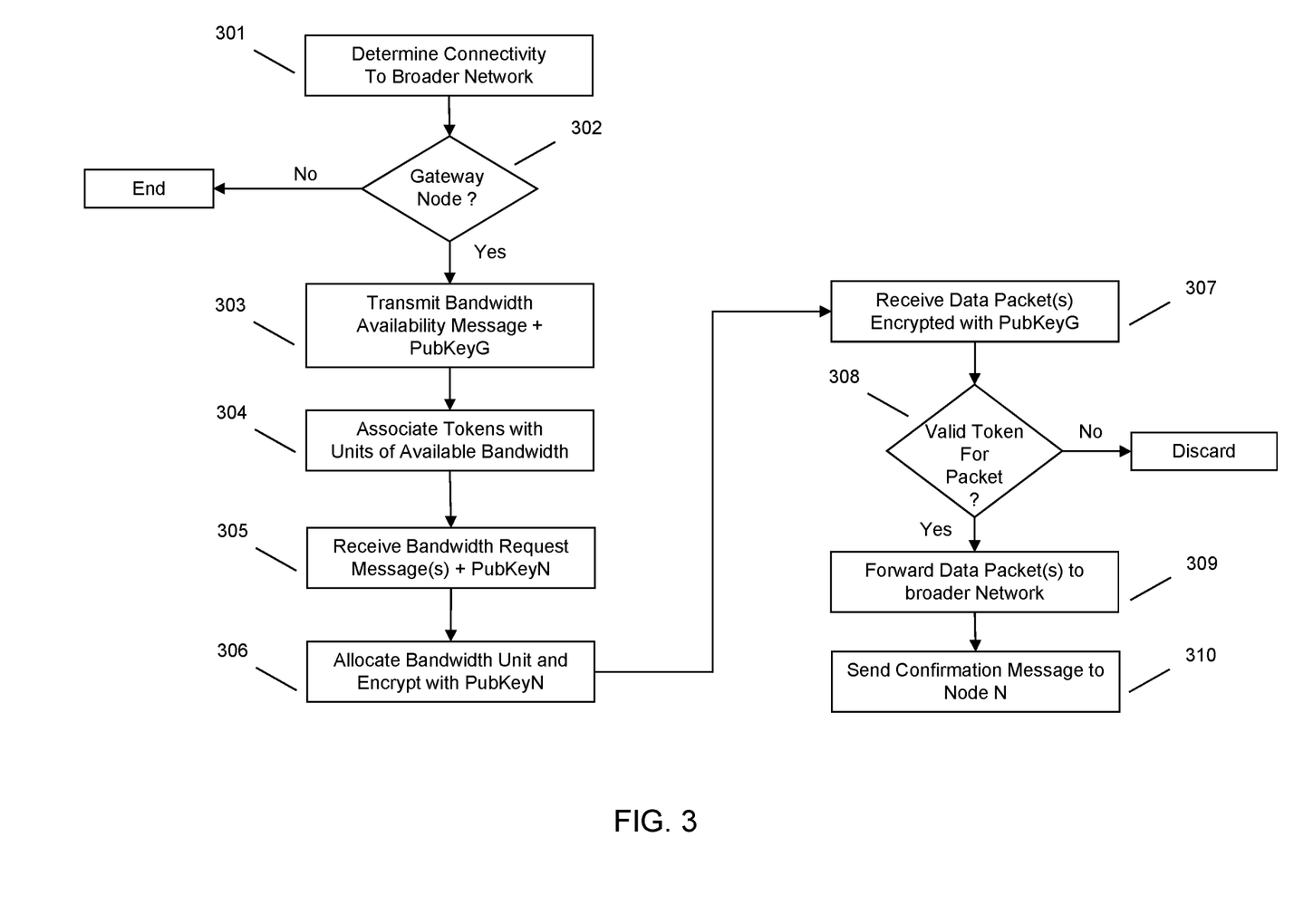
FIG. 3 illustrates an example method of allocating available bandwidth within a local network according to an embodiment.

FIG. 3 outlines an example of packet-specific network bandwidth allocation in a local network according to an embodiment. In a network, e.g., a peer-to-peer network with one or more nodes, a particular node, referred to herein as Node G (for gateway), acts as a network gateway for other nodes, referred to herein as Node N. Node G is a node capable of transmitting data packets to a broader network such as the Internet.

At 301, Node G determines that it has access to the broader network and thus may act as a gateway for connecting other nodes, e.g., Node N, to the network. If Node G has connectivity to the broader network, it may determine that it will act as a gateway node for one or more other nodes, e.g., as illustrated at 302. The determination at 302 may be based on a policy. For example, even though Node G can connect to the broader network, as determined at 301, it does not have to act as a gateway for other nodes. Thus, Node G may act as a gateway according to a rule or set of rules, e.g., as determined by an administrative user, as determined by the quality of connection to the broader network, as determined by its length of availability, battery capacity, power state, etc.

Gateway activity may be applied recursively. Networks often have a tree-like, branching structure, where any given gateway can be seen as a regular node by the gateway one level higher. The upper-level gateway provisions bandwidth to the lower gateway using a token-granting method and the lower gateway subdivides that bandwidth for its own client nodes. This process may be applied up and down the network's structure.

If Node G determines that it will act as a gateway for one or more other nodes at 302, Node G advertises that capability to the rest of the network, as illustrated at 303. For example, Node G transmits its public key, PubKeyG, of a public-private pair, e.g., PubKeyG, PrivKeyG, with an advertisement message regarding available bandwidth units.

Node G associates tokens with the bandwidth units at 304 such that Node G may track to which node(s) in the network the bandwidth units have been allocated. This may be incorporated into a cryptographic process such that the token is delivered to a particular node, e.g., Node N, for use in communicating with Node G, as further described herein.

Local network nodes, e.g., Node N, that want to obtain the network bandwidth units from Node G register with Node G. For example, as illustrated at 305 Node N provides a public key, PubKeyN, of its own public-private pair, PubKeyN, PrivKeyN, to Node G in a request for bandwidth. Node G caches this public key for later use in distributing token(s) awarded to Node N, if any. As will be described further herein, the allocation of tokens may be accomplished according to a variety of techniques.

The tokens may take a variety of forms. For example, at 304, Node G may create pseudorandom tokens for each unit of network bandwidth it offers to the local network. Each token may be given a duration of validity, or may be valid only during a specific time window.

Node G may distribute the bandwidth tokens according to a variety of mechanisms. For example, network nodes, such as Node N, may have to successfully bid on or purchase the tokens from Node G. Awarded tokens then may be distributed or allocated according to a costing function such as a round-robin function, a predefined priority function, or a function which sorts by traffic type, etc. In an embodiment, each token is encrypted with the public key for the selected local network node, e.g., Node N, and is sent through the network to the node. Thus, as illustrated at 306, Node G may allocate a bandwidth unit to Node N and distribute the token to Node N by encrypting the token with PubKeyN of Node N.

The granted node, in this example Node N, receives the token and decrypts with its private key, here PrivKeyN. Then Node N attaches the network payload data (referred to herein as packet(s)) to the token, encrypts the data (packet(s) and token), e.g., with PubKeyG of Node G, and sends the data through the network to Node G.

As illustrated at 307, Node G receives the data from Node N, decrypts the data with its private key, PrivKeyG, and verifies the token to be valid in its stored list. If the token verifies, as determined at 308, Node G forwards the payload to the broader network at 309, e.g., the Internet. Otherwise, Node G may exercise bandwidth control, e.g., discard the requested outgoing data. Optionally, Node G may also send a message (e.g., a confirmation or acknowledgement) to the originating local node, in this example Node N, as illustrated at 310.

A gateway node, e.g., Node G in the example used herein, may use a variety of techniques for advertising its bandwidth availability, e.g., as illustrated in FIG. 3 at 303. For example, Node G may provide peer-to-peer transmissions alerting nodes within the network to the fact that Node G is a gateway node with available bandwidth.

Similarly, Node G may award bandwidth tokens in a variety of ways. For example, to facilitate creating a market for bandwidth inside a local network, nodes such as Node N and/or other nodes, may advertise a desire to acquire more tokens than they currently possess. Nodes with more tokens than they need may choose to release unused tokens, optionally with a price metric attached. The released tokens may be transmitted back to the gateway node from which it originated or may be released directly to a requesting (e.g., peer) node, optionally upon verification of virtual payment.

For example, each node may listen (continuously, periodically, etc.) for a broadcast containing data regarding new public keys and cache the public keys locally. Nodes may also engage in periodic comparison and synchronization of public key tables or listings. Using such data on available public keys (and associated tokens), the nodes within the network will be apprised of which other node(s) have available tokens that may be requested. As part of the request and exchange process, the nodes may negotiate payment for the unused and available tokens, e.g., similar to the process engaged in between an originating gateway node and a requesting node.

It is not strictly necessary that a token itself contain data tying it to a particular public key, although this may be useful in some situations. If the token is simply a hard-to-guess value, such as a random number generated and remembered by the gateway, it could be traded from node to node without needing the gateway to participate in the transaction. If, on the other hand, it is desired to prevent node to node trades, then the gateway would incorporate some aspect of the intended recipient's public key in to the token itself, sign it with its own private key, and send it to the recipient.

Figure 4:
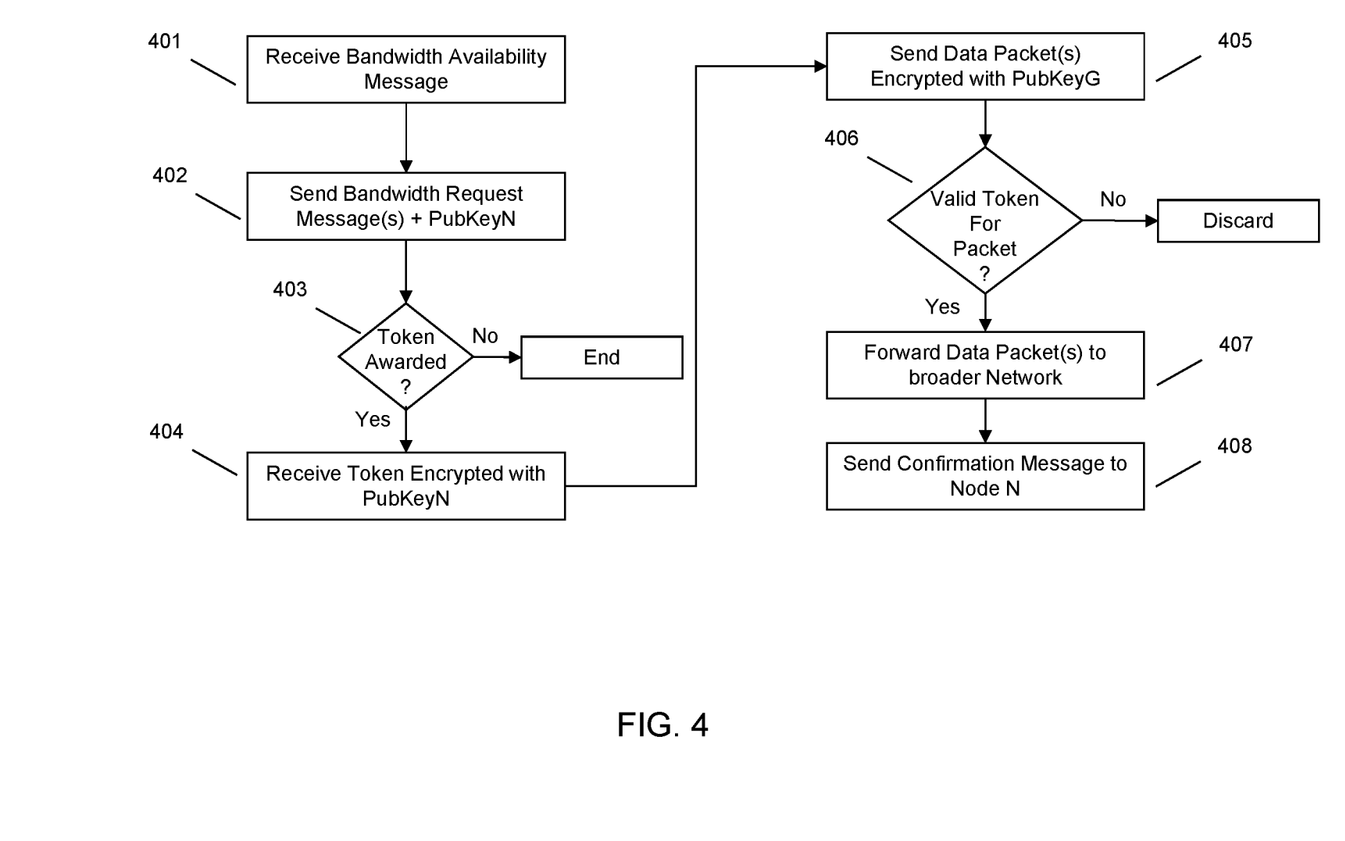
FIG. 4 illustrates an example of obtaining available bandwidth within a local network according to an embodiment.

As shown for example in FIG. 4, an embodiment provides a method of obtaining available bandwidth within a local network using tokens. A node may request network bandwidth directly from a gateway node. In such a case, the process is essentially similar to that illustrated in FIG. 3, although the process proceeds from the viewpoint of the requesting node. In an embodiment, however, another node or nodes within the network (i.e., a non-gateway node) may distribute tokens. It is also possible for the token issuing and tracking functions to be implemented separately and centrally. In this context, it may be necessary to have a hardened and secure path from each gateway to the token issuer/manager.

By way of specific example, if a node (e.g., Node N+1) within the local network has obtained token(s) from a gateway node, it may re-distribute the token(s) to other nodes, e.g., sell them, trade them, or give them away. Thus, at 401, a node (again Node N in this example) in need to tokens and within the local network may receive a bandwidth availability message, e.g., from Node N+1 within the network that has previously obtained token(s) from a gateway node, Node G.

In response, Node N (having received (or otherwise obtained) the bandwidth availability message) may become a requesting node, i.e., send a bandwidth request message to Node N+1 that has the token(s) available, as shown at 402. In the illustrated example, the request transmitted at 402 may contain the requesting node's public key, illustrated again as PubKeyN.

At 403, Node N+1 within the local network determines if the token(s) should be awarded to the requesting node, Node N, e.g., based on a policy (such as purchase price being met, request received in time according to a first come-first serve policy, etc.). If not, the process ends and Node N may attempt to obtain tokens from another source, e.g., the gateway node, Node G.

However, if the token(s) is/are awarded to Node N at 403, then the Node N receives the token(s) at 404. This award may include the token(s) as encrypted with the Node N's public key, PubKeyN. Node N then may use the token(s) (which it may decrypt using Node N's private key) to send data packet(s) to the gateway node, Node G, encrypted with Node G's public key, PubKeyG, as shown at 405. The gateway node will, if the token(s) are valid as determined at 406, forward the packet(s) onto the broader network, as shown at 407. As before, if the token is not valid (e.g., is not received by the gateway in a predetermined time frame, the transmission between Node N+1 and Node N was not authorized, etc.), the packets may be denied forwarding. The gateway may send a confirming message to Node N, as illustrated at 408.

An embodiment facilitates nodes within the network exchanging their network availability, e.g., according to a time schedule or policy. For example, a particular node may provide availability to a broader network to another device at a first time (e.g., during the day) and then receive, from that same device, availability to a broader network at another time (e.g., during the night). Furthermore, the providing of network availability may be facilitated by token exchanges between the nodes, as described herein.

An embodiment may determine that one or more tokens were used, e.g., according to a time scheduled exchange, and thereafter request, at a different time, availability to a broader network from one or more devices associated with the use of the one or more tokens. Thus, a node may keep track of which token(s) were used by which device(s), and thereafter use this information in requesting network availability. In order to facilitate this accounting or tracking process, the one or more tokens may include an identification and an amount of availability to the broader network used.

The usage of available network bandwidth is therefore intelligently managed by one or more gateway nodes according to an embodiment. This process ensures that a network gateway will not be congested with unwanted or unauthorized network traffic. Moreover, because the gateway node(s) are capable of allocating bandwidth according to a node-specific process (using tokens, as described herein), the usage of the network may be managed to prevent network slowdowns. Further, the gateway node(s) are positioned to control network usage, e.g., according to a payment mechanism agreed to by requesting node(s) within the network.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. A storage device may be, for example, an electronic, magnetic, electromagnetic, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a magnetic storage device, or any suitable combination of the foregoing. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., peer-to-peer communications, near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    allocating, at a node within a local peer-to-peer network, availability to a broader network into one or more bandwidth units, wherein the node acts as a network gateway for other nodes that communicate with the node to communicate with the broader network through the node via use of tokens;
    associating, using a processor, one or more tokens with the one or more bandwidth units, wherein each of the one or more tokens identify a bandwidth allocation value corresponding to the token, wherein the associating comprises registering one or more nodes with the node to communicate with and receive bandwidth allocation from the node;
    distributing, per a costing function, from the node and over a network, a portion of the one or more tokens to a requesting node responsive to the requesting node successfully purchasing the portion of the one or more tokens, the requesting node comprising one of the one or more nodes registered with the node, wherein the node tracks a number of tokens distributed to a requesting node, wherein the requesting node is allocated a bandwidth for communicating with the broader network based upon the bandwidth allocation value of the portion of the one or more tokens distributed to the requesting node, wherein the distributing comprises encrypting the portion of the one or more tokens;
    receiving, over a network, the one or more tokens from the requesting node, wherein the one or more tokens have been associated with network payload from the requesting node; and
    in response to confirming that the one or more tokens are valid at the node and that the network payload does not exceed the bandwidth allocation value, sending the network payload of the requesting node onto the broader network via the node.

2. The method of claim 1, wherein the distributing comprises distributing the one or more tokens to an authorized node.

3. The method of claim 2, wherein an authorized node is a node that is awarded the one or more tokens by the node within the local network according to a policy.

4. The method of claim 3, wherein the distributing comprises encrypting the one or more tokens using a key specific to the requesting node.

5. The method of claim 1, wherein the confirming comprises decrypting the one or more tokens using a key specific to the requesting node.

6. The method of claim 1, wherein the node within the local network comprises a gateway node.

7. The method of claim 6, wherein the local network comprises a peer-to-peer network.

8. The method of claim 1, further comprising, in response to determining that the one or more tokens are invalid, not sending the network payload onto the broader network.

9. The method of claim 1, wherein the one or more tokens are valid for a period of time.

10. The method of claim 1, wherein the one or more tokens are valid for a specified payload data amount.

11. The method of claim 1, further comprising:
    determining that one or more tokens were used; and
    requesting, at a different time, availability to a broader network from one or more devices associated with the use of the one or more tokens.

12. The method of claim 11, wherein the one or more tokens comprise an identification and an amount of availability to the broader network used.

13. A method, comprising:
    sending, from a requesting node to another node within a local peer-to-peer network, a request for one or more tokens associated with bandwidth units of availability to a broader network, wherein each of the one or more tokens identify a bandwidth allocation value corresponding to the token, wherein the another node has access to the broader network, wherein the another node acts as a network gateway for other nodes, including the requesting node, to communicate with the another node to communicate with the broader network through the another node utilizing tokens, wherein the requesting node is registered with the another node to communicate with and receive bandwidth allocation from the another node;
    receiving, from the another node and at the requesting node, a portion of the one or more tokens responsive to the requesting node successfully purchasing the portion of the one or more tokens, wherein the another node distributes the one or more tokens per a costing function, encrypts the portion of the one or more tokens during distribution, and tracks a number of tokens distributed to a requesting node, wherein the requesting node is allocated a bandwidth for communicating with the broader network based upon the bandwidth allocation value of the portion of the one or more tokens distributed to the requesting node;
    associating, by the requesting node, the one or more tokens with network payload, wherein the one or more tokens confirm that the network payload is valid and that the network payload does not exceed the bandwidth allocation value; and sending, over the local network, the one or more tokens and the network payload to the another node for transmission onto the broader network via the another node.

14. The method of claim 13, wherein the requesting node within the network obtained the one or more tokens from the another node.

15. The method of claim 13, wherein the request comprises payment for the one or more tokens.

16. The method of claim 14, wherein the receiving comprises receiving a public key of the another node.

17. The method of claim 16, further comprising encrypting at least the one or more tokens with the public key of the another node.

18. The method of claim 13, further comprising encrypting the network payload.

19. The method of claim 13, further comprising receiving a message indicating that the another node has the one or more tokens available.

20. The method of claim 19, wherein the requesting proceeds after the message is received by the requesting node.

21. The method of claim 13, further comprising:
sending one or more tokens to another device; and
receiving, from the another device, one or more other tokens after the sending;
wherein one or more of the sending and the receiving are scheduled at a particular time.

22. The method of claim 13, further comprising:
providing availability to a broader network to another device; and
receiving, from the another device, availability to a broader network after the providing;
wherein one or more of the providing and the receiving are scheduled at a particular time.

23. A device, comprising:
a network communication device;
a processor operatively coupled to the network communication device; and
a memory storing instructions executable by the processor to:
allocate, at a node within a local peer-to-peer network, availability to a broader network into one or more bandwidth units, wherein the node acts as a network gateway for other nodes that communicate with the node to communicate with the broader network through the node via use of tokens;
associate one or more tokens with the one or more bandwidth units, wherein each of the one or more tokens identify a bandwidth allocation value corresponding to the token, wherein the associating comprises registering one or more nodes with the node to communicate with and receive bandwidth allocation from the node;
distribute, per a costing function, from the node and over a network, a portion of the one or more tokens to a requesting node responsive to the requesting node successfully purchasing the portion of the one or more tokens, the requesting node comprising one of the one or more nodes registered with the node, wherein the node tracks a number of tokens distributed to a requesting node, wherein the requesting node is allocated a bandwidth for communicating with the broader network based upon the bandwidth allocation value of the portion of the one or more tokens distributed to the requesting node, wherein to distribute comprises encrypting the portion of the one or more tokens;
receive, over a network, the one or more tokens from the requesting node, wherein the one or more tokens have been associated with network payload from the requesting node; and
in response to confirming that the one or more tokens are valid at the node and that the network payload does not exceed the bandwidth allocation value, send the network payload of the requesting node onto the broader network via the node.

24. The device of claim 23, wherein the device is an end user device acting as a gateway in a peer-to-peer network.

25. The device of claim 23, wherein the memory stores instructions executable by the processor to:
determine that one or more tokens were used; and
request, at a different time, availability to a broader network from one or more devices associated with the use of the one or more tokens.

26. The method of claim 25, wherein the one or more tokens comprise an identification and an amount of availability to the broader network used.

* * * * *